United States Patent [19]

Davis

[11] Patent Number: 5,076,975

[45] Date of Patent: * Dec. 31, 1991

[54] PRODUCTION OF RADIATION CURED ELASTOMER COATED PASSIVE RESTRAINT DEVICE

[75] Inventor: Delbert A. Davis, Mishawaka, Ind.

[73] Assignee: Uniroyal Plastics Company, Inc., Mishawaka, Ind.

[ * ] Notice: The portion of the term of this patent subsequent to Feb. 19, 2008 has been disclaimed.

[21] Appl. No.: 636,357

[22] Filed: Dec. 26, 1990

Related U.S. Application Data

[63] Continuation of Ser. No. 212,550, Jun. 28, 1988, Pat. No. 4,994,225.

[51] Int. Cl.$^5$ ................ B60R 21/16; B29C 35/08; B29C 41/02

[52] U.S. Cl. .................... 264/22; 264/257; 264/292; 264/314; 264/324; 264/516; 264/317; 264/DIG. 44; 156/165; 29/421.1

[58] Field of Search ............ 264/22, 25, 24, 313, 264/314, 316, 291, 292, 231, 257, 103, 510, 512, DIG. 50, DIG. 57, 136, 324, 322, 294, 516, 317, DIG. 44; 425/403, 392, DIG. 12, DIG. 14, DIG. 19; 156/500, 220, 221, 160, 163, 165; 280/743; 29/421.1

[56] References Cited

U.S. PATENT DOCUMENTS

| | | | |
|---|---|---|---|
| 1,701,472 | 2/1929 | Dinsmore | 264/291 |
| 2,430,931 | 11/1947 | Hershberger | 220/456 |
| 2,550,894 | 1/1951 | Weisbecker | 264/291 |
| 2,700,181 | 1/1955 | Wilson | 425/403 |
| 2,751,953 | 6/1956 | Grimm | 150/5 |
| 2,886,853 | 5/1959 | Herman et al. | 264/314 |
| 3,040,383 | 6/1962 | Nassimbene | 264/231 |
| 3,135,640 | 6/1964 | Kepka et al. | 156/500 |
| 3,138,507 | 6/1964 | Wiltshire | 264/324 |
| 3,316,337 | 4/1967 | North | 264/314 |
| 3,356,446 | 12/1967 | Cooper et al. | 264/324 |
| 3,445,055 | 5/1969 | Port et al. | 229/53 |
| 3,451,693 | 6/1969 | Carey | 280/739 |
| 3,453,164 | 7/1969 | Gursky et al. | 156/198 |
| 3,490,973 | 1/1970 | Graff et al. | 156/500 |
| 3,497,587 | 2/1970 | Ikeda et al. | 264/314 |
| 3,554,368 | 1/1971 | Nagel | 206/46 |
| 3,567,536 | 3/1971 | Wickersham, Jr. | 156/78 |
| 3,576,703 | 4/1971 | Baker et al. | 156/221 |
| 3,705,645 | 12/1972 | Konen | 206/46 R |
| 3,713,936 | 1/1973 | Ramsay, Jr. | 264/134 |
| 3,723,234 | 3/1973 | MacDonald | 138/109 |
| 3,730,551 | 5/1973 | Sack et al. | 280/743 |
| 3,761,111 | 9/1973 | Kemper | 280/150 AB |
| 3,792,873 | 2/1974 | Buchner et al. | 280/743 |
| 3,807,754 | 4/1974 | Rodenbach et al. | 280/743 |
| 3,810,654 | 5/1974 | DeBano, Jr. et al. | 280/150 AR |
| 3,814,658 | 6/1974 | Decker | 428/252 |
| 3,819,638 | 6/1974 | Ogawa et al. | 264/324 |
| 3,888,504 | 6/1975 | Bonn et al. | 280/743 |
| 3,892,425 | 7/1975 | Sakairi et al. | 280/743 |
| 3,937,488 | 2/1976 | Wilson et al. | 280/743 |
| 3,951,190 | 4/1976 | Suter | 220/1 B |
| 3,989,789 | 11/1976 | Brookhart | 264/136 |
| 4,006,918 | 2/1977 | MacFarland | 280/729 |
| 4,145,388 | 3/1979 | Off et al. | 264/24 |
| 4,146,667 | 3/1979 | Stannard | 428/262 |
| 4,196,534 | 4/1980 | Shibamoto | 40/10 R |
| 4,213,634 | 7/1980 | Hoshino et al. | 280/728 |
| 4,215,171 | 7/1980 | Marco et al. | 428/245 |
| 4,253,507 | 3/1981 | Williamson | 150/1 |
| 4,262,931 | 4/1981 | Strasser et al. | 280/729 |
| 4,360,124 | 11/1982 | Knaus et al. | 220/452 |
| 4,446,092 | 5/1984 | Bliley | 264/314 |
| 4,508,294 | 4/1985 | Lorch | 244/122 AG |
| 4,805,930 | 2/1989 | Takada | 280/739 |
| 4,808,362 | 2/1989 | Freeman | 264/314 |
| 4,921,735 | 5/1990 | Bloch | 428/34.9 |
| 4,977,016 | 12/1990 | Thornton et al. | 428/225 |

FOREIGN PATENT DOCUMENTS

| | | | |
|---|---|---|---|
| 54-76 | 1/1979 | Japan | 264/292 |
| 54-122367 | 9/1979 | Japan | 264/108 |
| 56-105954 | 8/1981 | Japan | 264/292 |
| 853926 | 11/1960 | United Kingdom | 264/22 |
| 2156394 | 10/1985 | United Kingdom | . |

Primary Examiner—Jeffery Thurlow
Assistant Examiner—Mathieu Vargot
Attorney, Agent, or Firm—Pennie & Edmonds

[57] ABSTRACT

An elastomer-coated fabric for use as a confinement. The confinement is formed by conforming a fabric to a mold having the shape of the desired confinement, and subsequently applying a layer of elastomer to the fabric. A curing operation then cures the elastomer such that the elastomer-coated fabric retains the shape of the mold. Advantageously, the curing operation also relaxes and heat sets the fabric in order to permit a controlled amount of further stretch, even if the fabric was stretched a maximum amount when it was conformed to the mold.

22 Claims, No Drawings

PRODUCTION OF RADIATION CURED ELASTOMER COATED PASSIVE RESTRAINT DEVICE

This is a continuation of application Ser. No. 07/212,550 filed June 28, 1988, now U.S. Pat. No. 4,994,225.

FIELD OF THE INVENTION

The present invention relates generally to the formation of fabric confinements and more particularly to the formation of a molded elastomer-coated fabric air restraint bag.

BACKGROUND OF THE INVENTION

Much attention has recently been directed to the formation of fabric confinements requiring special characteristics. For example, the automobile industry has become increasingly concerned with safety of automobile occupants during a crash. It is known to construct a confinement, referred to as an "air bag" in an automobile which is inflated upon detection of a crash. Today, many automobile manufacturers have met consumer concern for safety through the inclusion of air bags in motor vehicles not only as optional equipment but also as standard equipment.

However, manufacturers have encountered difficulty and expense in the formation and production of air bags of specified shapes and dimensions.

A typical air restraint system presently utilized in passenger motor vehicles includes an inflatable confinement, or air bag, an impact detector and an inflating means. Upon detection of an impact greater in magnitude than a threshhold impact, the impact detector provides a signal to the inflating means which causes the inflating means to inflate the confinement. The inflating means illustratively comprises a pyrotechnic or gas producing means. Thus, the inflated confinement serves to protect the passenger and/or driver from what is often considered the most serious effect of an automobile collision—a secondary collision, i.e., the collision between an occupant and the interior of the motor vehicle.

Unfortunately, any such air restraint system is effective in preventing personal injury only to the extent that the occupant properly contacts the inflated bag. Thus, the dimensions and shape of an inflated air bag are critical and are often dictated by an exacting specification.

The specific shape and dimensions of any particular air bag are affected by the position in which it is placed in a motor vehicle. Consideration must be given to not only the position of the protected occupant(s) but also to the portion of the vehicle's interior in close proximity to the air bag and against which the air bag will be forced in a collision. Such design considerations, among others, have led to uniquely shaped air bags. For example, U.S. Pat. No. 4,262,931 to Strasser et al. discloses an air bag having a plurality of compartments for knee, torso and head restraint, some of which deploy towards one of the passenger seating positions and some of which expand laterally across the vehicle interior in front of the adjacent passenger position. This particular device also utilizes a pressure regulating valve flap between compartments. U.S. Pat. No. 3,937,488 to Wilson et al. depicts an elongated air bag of approximately rectangular cross-section and planar end sections. This particular device utilizes two different materials of different air permeability to form the air bag.

Some known devices have attempted to solve problems associated with providing air bags of precise shapes and dimensions through stitching together separate sheets of fabric so as to form a desired shape. Unfortunately, stitched seams in known air bags have encountered difficulty in maintaining the pressure within the bag during inflation. Air bags, in order to be effective, must inflate within a fraction of a second. Such a rapid rate of inflation leads to the exertion of a tremendous tensile load on the stitching. Such stitching decreases the overall strength of the fabric at the seam due to the perforations in the fabric inherent from the stitching process. Additionally, the strength of the stitching thread must be considered, as well as the additional cost of stitching.

Furthermore, stitching of separate sheets of fabric, whether they are identical or of different air permeability, increases the bulk of the air bag, as the seam will have a thickness which is at very least the sum of the thickness of both separate sheets of fabric. With the current practice of downsizing vehicles, any unnecessary bulk is most undesirable. Stitching is also undesirable since it produces a protrusive stitched surface which may harm an occupant whom it contacts. Illustrative of air bags constructed from stitched together layers of fabrics is that disclosed in U.S. Pat. No. 3,892,425 to Sakairi et al.

For the sake of completeness, it has been recognized that air restraint bags which at least partially deflate soon after, or even during, inflation advantageously provide a means to counteract the dangerous effect known as rebound. Such controlled deflation permits the air bag to absorb more energy from the occupant.

Various methods have been proposed for the controlled deflation of air bags. Illustrative of such methods are those disclosed in U.S. Pat. Nos. 3,937,488 to Wilson (air bag constructed from at least two materials having different air permeability values) and 3,892,425 to Sakairi et al. (air bag 5 constructed from coated material wherein expansion of the air bag stretches the stitches of the fabric, creating new openings through the coating in addition to microporous openings).

Additionally, the exacting specifications to which an air bag manufacturer must adhere to include requirements relating to shape, dimension, energy absorption, inflation and deflation time periods, toxicity, flammability, temperature and accelerated aging resistance. Unfortunately, the use of coated fabrics can present difficulty in meeting such requirements.

SUMMARY OF THE INVENTION

This present invention relates to an air bag restraint system for protecting an occupant of a vehicle during a collision comprising an inflatable confinement adapted for attachment to the vehicle and inflatable upon collision of the vehicle. The confinement is constructed from a seamless mold-formed elastomer-coated stretchable fabric. Such a system also includes means for inflating the confinement with a fluid upon the occurrence of a collision. The inflating means inflates the confinement to a predetermined shape upon a collision, the shape being determined by characteristics of the mold-formed elastomer-coated fabric. The elastomer coating is preferably cross linked and illustratively ranges in thickness from 0.5 to 10 mils.

The elastomer coating comprises any suitable material which renders the fabric essentially non-porous and non-permeable. Such material preferably has a sufficiently long shelf life and tends not to become brittle with age or temperature extremes. Additionally, in the event that pyrotechnic means are employed to inflate the confinement, the elastomer must be especially resistant to heat. Illustrative of suitable materials are neoprene, nitrile, silicone, acrylic, urethane, polyvinyl chloride (PVC), butyl, ethylene propylene diene monomer elastomers (EPDM), or a combination of these and/or other suitable materials. Additionally, coatings disclosed in U.S. Pat. No. 3,807,754 to Rodenbach et al. which is incorporated herein by reference may be employed with the present invention.

In one embodiment, the fabric is knit on production units such as what is known in the art as "Tricot", "Rashel", "Simplex" or "Weft" machines. These illustrative machines produce a circular or "stocking-like" product in which bands of increasing or decreasing fabric density may be introduced by increasing or decreasing the number of yarn ends in a tube of the device.

The fabric is preferably knitted from a yarn having a filament or spun configuration which suitably enhances the fabric by elongating under tension and shrinking and/or relaxing when exposed to heat.

Advantageously, desired confinement configurations may be obtained by employing non-uniform fabric density in the stocking-like confinement. Such non-uniform density allows, for example, a high degree of expansion in a body portion of the confinement and a low degree of expansion in a neck and a toe portion of the confinement, i.e., a reinforced neck and toe portion.

The fabric provides resistance to tear and may be constructed of a wide variety of materials. Illustrative materials include cloth, plastic, metal, fiberglass or any other material which may be made to take on a desired shape. Preferably, the fabric is knitted so as to be stretchable in both a machine direction and a cross-machine direction so as to easily conform to a desired shape. The fabric is relaxed and heat set to permit further stretch during inflation.

The inflatable confinement is preferably provided with means for deflating operative during and/or after the inflating process so as to prevent rebound of the occupant engaging the confinement. The means for deflating may comprise a plurality of ports through which the fluid flows outward.

The inflating means is provided to quickly inflate the confinement during a collision and illustratively is a pressurized fluid or pyrotechnic system. Furthermore, the fluid utilized is preferably a gas.

The present invention also relates to an improved passive air restraint device of the type having an air bag inflatable upon a collision, inflating means to inflate the air bag upon the collision and collision detection means to detect a collision of magnitude at least equal to a threshhold magnitude, wherein the improvement comprises a seamless air bag formed from a stretchable fabric having thereupon an elastomer coating so as to render the fabric essentially non-porous and non-permeable. Advantageously, the seamless air bag is deflatable and then inflatable to a desired shape.

The present invention also relates to a method for manufacturing an inflatable confinement for use in protecting an occupant of a vehicle during a collision, which method comprises providing a mold having an exterior surface forming a desired shape, conforming a stretchable fabric to the exterior surface of the mold, applying an elastomer coating to the fabric and heating the elastomer coating at a sufficient temperature for a sufficient time to provide a cured elastomer-coated fabric having a shape identical to the shape of the mold. Advantageously, the heating relaxes and heat sets the fabric so as to permit subsequent stretching of said elastomer-coated fabric. The subsequent stretching of the elastomer-coated fabric is approximately from three to twenty-five percent beyond the size of the mold upon which it is heated and is brought about during operation of the device as the fluid rushes in to the confinement.

The step of conforming the stretchable fabric to the shape of the mold comprises applying the fabric over an exterior surface of an at least partially deflated inflatable mold and inflating the mold to a predetermined size, thus stretching the fabric to take on the shape of the exterior surface of the of the mold. Once the curing operation is complete, the inflatable mold is deflated so as to facilitate removal of the elastomer-coated fabric from the mold.

The present invention also relates to a method of manufacturing an inflatable confinement for use in passive air bag restraint devices which comprises applying a seamless knitted fabric stretchable in both a machine and a cross-machine direction onto an at least partially deflated inflatable mold, inflating the inflatable mold to a predetermined size having an exterior surface of a desired shape, thus stretching the fabric as the mold is inflated, applying an elastomer coating to the stretched fabric in an amount sufficient to render the stretched fabric essentially non-porous, curing the elastomer coating by heating to a predetermined temperature for a time sufficient to provide a cured elastomer-coated stretchable fabric having and retaining a shape identical to the desired shape of the exterior surface of the mold, the curing step also relaxing and heat setting the stretchable fabric so as to permit subsequent stretching of the elastomer-coated fabric during inflation of the confinement in a collision, and deflating the inflatable mold so as to facilitate removal of the elastomer-coated fabric from the mold.

DETAILED DESCRIPTION OF THE INVENTION

The present invention is a method and apparatus for protecting occupants of vehicles during sudden impact by way of an inflatable confinement comprising a fabric to which an elastomer coating has been applied, wherein the inflatable confinement is formed by application of the fabric over a mold followed by application of an elastomer layer to the fabric and subsequent curing of the elastomer.

More specifically, a mold is created in the shape of the desired product. The mold may take on a variety of shapes, and may have complex portions such as concave areas. Furthermore, the mold is preferably collapsible, so as to be easily removed from the cured product. Additionally, bladder type inflatable molds may be employed to form products of similar shapes but different dimensions. Alternatively, molds may be created from plaster of Paris, frangible materials, cardboard, or a wide variety of materials which can easily be made to break, dissolve, disintegrate, melt or the like so as to be separated from the fabric and elastomer. Collapsible type molds such as those incorporating a double-umbrella type structure may also be employed in the present invention. Such a double-umbrella type structure illustratively comprises, in collapsed form, a tubular shaped member which has a number of struts connected by suitable fabric, similar to an umbrella. Upon extension of the struts, an open umbrella configuration is achieved. Advantageously, two such sets of struts are provided in an end to end fashion such that a suitable confinement configuration is created upon expanding the tubular shaped member and extending the struts. In such an embodiment, the fabric is applied over the collapsed structure which is then extended and coated with an elastomer and cured. Subsequent to curing, the mold is collapsed and the confinement removed.

However, it is not necessary for a mold to deform, disintegrate, etc., depending on its shape and dimensions and the desired shape and dimensions of the finished product. If removal of the finished product from the mold can be accomplished without tearing the product, and without subjecting the product to undue force, a rigid mold is suitable for use with the present invention.

At the time of application of the fabric the inflatable mold is at least partially deflated, i.e., not in its fully inflated state, so as to facilitate application of the fabric. Once the fabric is applied, the inflatable mold is inflated and is in the shape of the desired end product, however, the mold is preferably inflated so as to be slightly smaller than the desired end product so as to allow for stretch caused by the sudden inrush of fluid during the inflation process. The degree to which the inflatable mold is deflated at the time of application of the fabric is partially determined by the amount of stretch to which the fabric may be subjected to during the inflation of the mold without tearing or otherwise deforming the fabric. The neck, or collar, area of the confinement is not produced with a reduced size so as to properly mate with a mechanism used to join the confinement to the pyrotechnic or gas producing means employed to deploy the confinement. The degree to which the inflated mold is smaller than the desired end product will depend on the specific type and quantity of elastomer and fabric, the velocity, quantity and flow of the fluid entering the confinement during inflation, the type of deflation system employed, as well as other factors. Rigid mold sizes, and inflated mold sizes for the case of an inflatable mold, of approximately three to twenty-five percent less than the size of the desired end product have been successfully employed.

The fabric to be applied over the mold may be any suitable fabric which conforms or may be made to conform to the shape of the mold. The term "fabric" as used herein is intended to include all materials suitable for use in making inflatable confinements in accordance with the invention. Illustratively, such fabrics may be constructed from cloth, plastic, metal, fiberglass and the like. Thus, knitted fabrics are generally preferable over woven fabrics, especially for complex shapes, since knitted fabrics are generally stretchable in the machine direction as well as in the cross-machine direction, unlike woven fabric. Typical knitted fabrics are underwear and socks.

A preferred fabric is constructed from yarn or thread of natural, synthetic or regenerated fiber that has been knit into a configuration to allow stretch in both the machine direction and the cross-machine direction. Fabric knit to have stretch of at least 150 percent in each such direction has been found to be suitable for a wide variety of molds.

Although such fabric may be knit into a wide variety of shapes, a sock or sleeve shape is preferable since it is easily placed over and conforms to molds of a wide variety of shapes. A fabric of shape, size and stretch suitable for placement over the mold without the formation of folds or voids is preferably employed.

Once the fabric is placed over the rigid or collapsible mold or, alternatively, once the fabric is placed over the at least partially deflated inflatable mold and the mold inflated, an elastomer coating is applied to the fabric. Preferably, a sufficient amount of elastomer is applied so as to render the fabric essentially non-porous and non-permeable to air under typical operating conditions. Application of the elastomer coating may be effected by any of a number of known means such as spraying the elastomer onto the fabric, dipping the fabric into the elastomer or brushing the elastomer onto the fabric. Additionally, the mold upon which the fabric is placed may be rotated as the elastomer is applied.

Any elastomer having suitable properties for the construction of a specific air bag in accordance with design specifications may be employed. Broadly, suitable air bags may be constructed with elastomers such as appropriately compounded chlorinated rubber, silicone, fluorosilicone, polyvinyl chloride, acrylate, or urethane. If necessary, permeability of the air bag may be adjusted by adjusting the amount of deposited elastomer. A range of one-half mil to ten mils has been found suitable for elastomer thickness, with two to seven mils being preferable.

Upon application of the elastomer to the mold-supported fabric, the elastomer is cured by curing methods such as by the application of heat. Additionally, the elastomer may be cured by radiation curing, in which the elastomer is exposed to a prescribed type and dose of radiation. Radiation curing permits the use of short curing times and also promotes a uniform curing of the elastomer.

Advantageously, the curing operation serves not only to cure the elastomer, but also to relax and heat set the threads or yarn of the fabric such that the fabric may be stretched to a greater extent than without such curing. In other words, even under circumstances in which it is necessary to stretch the fabric to its limit so as to conform to the mold shape, the fabric, once it has been relaxed and heat set by the curing operation, may be further stretched without tearing the fabric. Thus, when the air bag is inflated by inflating means such as a pyrotechnic or gas supply, the air bag will take on the dimensions required by the specification.

Subsequent to the curing process, the air bag is removed from the mold by an appropriate method. If a rigid mold were employed, the air bag is stretched and removed from the mold, while if an inflatable mold was employed, the mold is first deflated and then the air bag is removed. Alternatively, a disintegratable or frangible rigid mold can be utilized in which case the mold is first disintegrated, dissolved, broken, etc. and then the air bag is removed.

Upon removal of the air bag from the mold, the air bag is preferably reversed such that the untreated side of the fabric is exposed so as to conform to typical specifications in the air bag industry.

The cured air bag is preferably provided with means for deflating such that the air bag may absorb more net energy from the impact of a person. If no such deflating means were provided, the energy absorbed by the air bag from the impact of a person would be momentarily stored in the air bag as potential energy in the form of increased air bag pressure, and then expended in forcing the person away from the air bag with the same violent force with which he impacted the air bag and hence, rebound.

By providing means for controlling the deflation of the air bag, the energy absorbed by the air bag from the impact of a person is released by the air bag, however, it is not released in a manner harmful to the person. For example, the means for deflating may comprise ports in the air bag through which the fluid may escape as the person impacts the air bag. Any number of such ports as will properly absorb the energy of impact may be provided. Alternatively, a blowout patch or tear strip such as that disclosed in U.S. Pat. No. 3,451,693 to Carey which enlarges as pressure within the air bag increases may be provided.

While it is apparent that the invention herein disclosed is well calculated to fulfill the objects above stated it will be appreciated that numerous modifications and embodiments may be devised by those skilled in the art, and it is intended that the appended claims cover all such modifications and embodiments as fall within the true spirit and scope of the present invention.

More specifically, the present invention is not limited to use in automobiles. The elastomer coated fabric may be used as an inflatable confinement for protecting persons in trains, planes, boats or any other application requiring inflation of a confinement having specified shape. Furthermore, the specific type and quantity of elastomer applied to the fabric will depend on the desired shape, size and stretch of the confinement.

What is claimed is:

1. A method for manufacturing an inflatable confinement for use in protecting an occupant of a vehicle during a collision, which method comprises:
    providing a mold having an exterior surface forming a desired shape;
    conforming a stretchable knitted fabric to said exterior surface of said mold, by applying said fabric over said exterior surface of an at least partially deflated inflatable mold and inflating said mold to a predetermined size, thus stretching said fabric to take on said shape of said mold;
    subsequently applying an elastomer coating to said fabric; and
    curing said elastomer coating with a sufficient dose of radiation and for a sufficient time to provide a cured elastomer-coated fabric having a shape identical to said shape of said mold;
    wherein said curing step relaxes and sets said fabric so as to permit subsequent stretching of said elastomer-coated fabric.

2. The method of claim 1 which further comprises deflating said inflatable mold subsequent to said heating step so as to facilitate removal of said elastomer-coated fabric from said mold.

3. The method of claim 1 wherein said subsequent stretching of said elastomer-coated fabric is approximately from three to twenty-five percent beyond the size of said mold upon which it is cured.

4. The method of claim 1 which further comprises selecting said elastomer coating from at least one of the group of neoprene, acrylic, silicone, nitrile, urethane, PVC, butyl and EPDM.

5. The method of claim 1 wherein said knitted fabric is stretchable in both a machine direction and a cross-machine direction.

6. The method of claim 1 wherein said fabric is of a stretchable metal, plastic or fiberglass structure.

7. A method of manufacturing an inflatable confinement for use in passive air bag restraint devices, which method comprises:
    applying a seamless knitted fabric stretchable in both a machine and a cross-machine direction onto an at least partially deflated inflatable mold;
    inflating said inflatable mold to a predetermined size having an exterior surface of a desired shape, thus stretching said fabric as said mold is inflated;
    applying an elastomer coating to said stretched fabric on said mold in an amount sufficient to render said stretched fabric non-porous;
    curing said elastomer coating at a predetermined dose of radiation for a time sufficient to provide a cured elastomer-coated stretchable fabric having and retaining a shape identical to said desired shape of said mold exterior surfaces, said curing step also relaxing and setting said stretchable fabric so as to permit subsequent stretching of said elastomer-coated fabric during inflation of said confinement in a collision; and
    deflating said inflatable mold so as to permit removal of said elastomer-coated fabric from said mold.

8. The method of claim 7 wherein said fabric is of a stretchable metal, plastic or fiberglass structure.

9. A method for manufacturing an inflatable confinement for use in protecting an occupant of a vehicle during a collision, which method comprises:
    providing a mold having an exterior surface forming a desired arcuate shape;
    conforming a stretchable knitted fabric to said exterior surface of said mold in a manner to provide bands of increasing or decreasing fabric density depending upon the shape of said mold, wherein said conforming said stretchable fabric comprises applying said fabric over said exterior surface of an at least partially deflated inflatable mold and inflating said mold to a predetermined size, thus stretching said fabric to take on said shape of said exterior surface of said mold;
    subsequently applying an elastomer coating to said fabric; and
    curing said elastomer coating at a sufficient radiation dosage and for a sufficient time to provide a cured elastomer-coated fabric having a shape identical to said shape of said mold;
    wherein said curing step relaxes and sets said fabric so as to permit subsequent stretching of said elastomer-coated fabric.

10. The method of claim 9 which further comprises deflating said inflatable mold subsequent to said heating step so as to facilitate removal of said elastomer-coated fabric from said mold.

11. The method of claim 9 wherein said subsequent stretching of said elastomer-coated fabric is approximately from three to twenty-five percent beyond the size of said mold upon which it is cured.

12. The method of claim 9 which further comprises selecting said elastomer coating from at least one of the group of neoprene, acrylic, silicone, nitrile, urethane, PVC, butyl and EDPM.

13. The method of claim 9 wherein said knitted fabric is stretchable in both a machine direction and a cross-machine direction.

14. The method of claim 9 wherein said knitted fabric is stretchable in both a machine direction and a cross-machine direction.

15. A method of manufacturing an inflatable confinement for use in passive air bag restraint devices, which method comprises:
providing a mold of a predetermined size and having an exterior surface of a desired shape;
applying a knitted seamless fabric onto said exterior surface on an at least partially deflated inflatable mold and inflating said mold to a predetermined size, thus stretching said fabric to take on said shape of said exterior surface of said mold;
subsequently applying an elastomer coating to said fabric in an amount sufficient to render said stretched fabric non-porous;
curing said elastomer coating for a time sufficient to provide a cured elastomer-coated stretchable fabric having and retaining a shape identical to said desired shape of said mold exterior surface, said curing step also relaxing and setting said stretchable fabric so as to permit subsequent stretching of said elastomer-coated fabric during inflation of said confinement in a collision; and
removing the inflatable confinement from said mold.

16. The method of claim 15 wherein said removal step includes deflating said mold so as to permit removal of said elastomer-coated fabric from said mold.

17. The method of claim 15 herein said removal step includes collapsing said mold so as to permit removal of said elastomer-coated fabric from said mold.

18. The method of claim 15 wherein said removal step includes disintegrating said mold so as to permit removal of said elastomer-coated fabric from said mold.

19. The method of claim 15 which further comprises selecting said elastomer coating from at least one of the group of neoprene, acrylic, silicone, nitrile, urethane, PVC, butyl and EDPM.

20. The method of claim 15 which further comprises selecting said stretchable fabric of a knitted construction which is stretchable in both a machine direction and a cross-machine direction.

21. The method of claim 15 wherein said fabric is of a stretchable metal, plastic or fiberglass structure.

22. The method of claim 15 wherein said coating is cured by exposing said elastomer to a predetermined dose of radiation.

* * * * *